(12) United States Patent
Matsuzawa

(10) Patent No.: US 8,098,897 B2
(45) Date of Patent: Jan. 17, 2012

(54) MULTI DIMENSIONAL IMAGING SYSTEM

(75) Inventor: Toru Matsuzawa, Kunitachi (JP)

(73) Assignee: Olympus Corporation, Hachioji-shi, Tokyo (JP)

( * ) Notice: Subject to any disclaimer, the term of this patent is extended or adjusted under 35 U.S.C. 154(b) by 1106 days.

(21) Appl. No.: 11/935,606

(22) Filed: Nov. 6, 2007

(65) Prior Publication Data

US 2008/0107306 A1 May 8, 2008

(30) Foreign Application Priority Data

Nov. 7, 2006 (JP) .................................. 2006-301932

(51) Int. Cl.
*G06K 9/00* (2006.01)
(52) U.S. Cl. ..................... 382/106; 356/3; 356/4; 356/5; 356/6; 356/7; 348/169; 348/170; 348/171; 348/172; 348/173
(58) Field of Classification Search .......... 382/100–107; 356/3–7, 27–33; 348/169–176, 85–92; 73/488–492
See application file for complete search history.

(56) References Cited

U.S. PATENT DOCUMENTS

| | | | | |
|---|---|---|---|---|
| 5,319,567 A | * | 6/1994 | Ebenstein | 700/192 |
| 5,675,377 A | * | 10/1997 | Gibas | 348/47 |
| 6,384,859 B1 | * | 5/2002 | Matsumoto et al. | 348/43 |
| 2005/0180602 A1 | * | 8/2005 | Yang et al. | 382/103 |

FOREIGN PATENT DOCUMENTS

| | | |
|---|---|---|
| JP | 10-177449 A | 6/1998 |
| JP | 11-120352 A | 4/1999 |
| JP | 2001-43458 A | 2/2001 |
| JP | 2003-209836 A | 7/2003 |

OTHER PUBLICATIONS

Japanese Office Action dated Jun. 28, 2011, issued in corresponding Japanese Patent Application No. 2006-301932.

* cited by examiner

*Primary Examiner* — Atiba O Fitzpatrick
(74) *Attorney, Agent, or Firm* — Westermna, Hattori, Daniels & Adrian, LLP

(57) ABSTRACT

An image processing apparatus comprises a distance measurement section for measuring a distance from the section to a subject for each pixel on the basis of a plurality of images photographed at different visual point positions. A setting section sets a range of the distance in which an obstacle is present. An image formation section executes image processing of replacing a first image signal relating to an obstructed region included in the range of the distance with a second image signal different from the first image signal on the basis of an output from the distance measurement section.

6 Claims, 7 Drawing Sheets

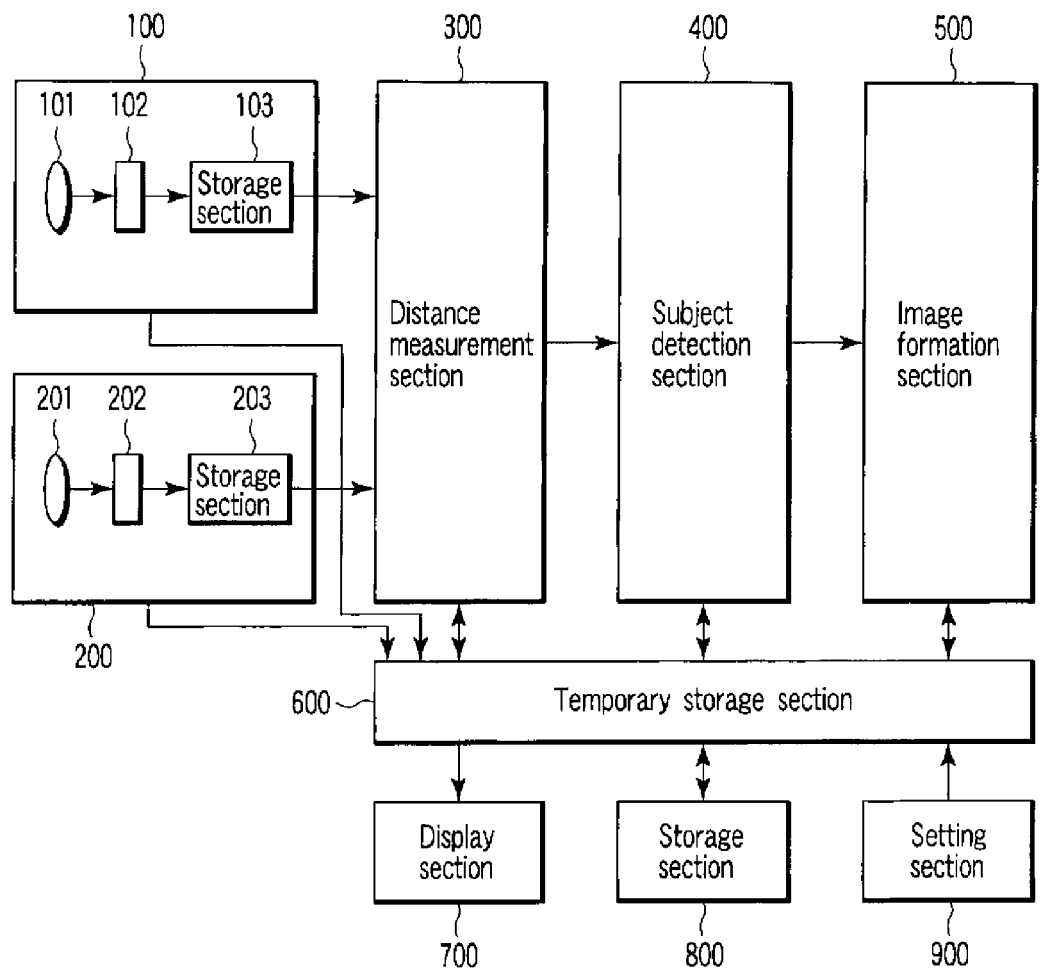
F I G. 1

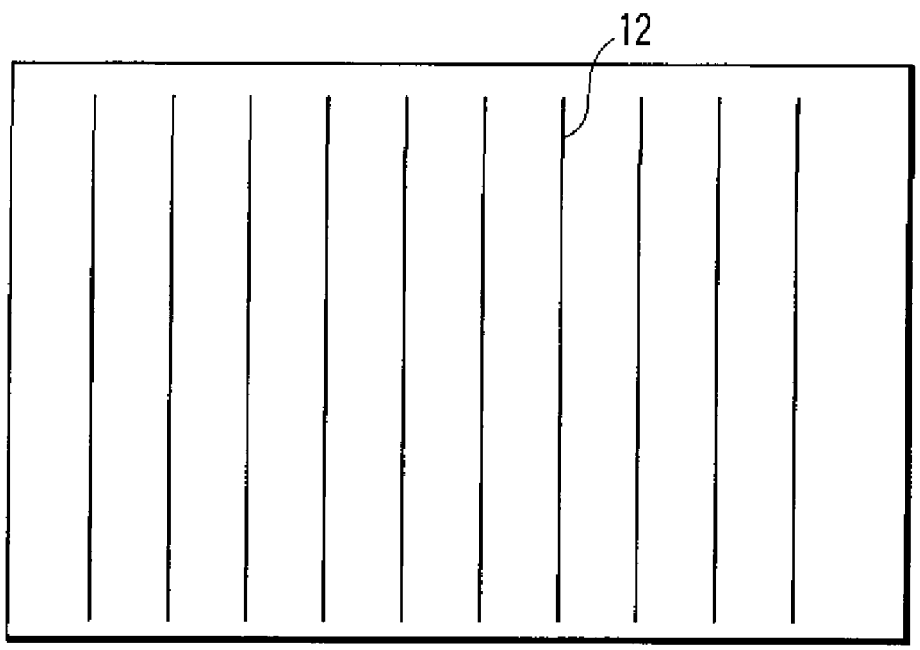
F I G. 7A
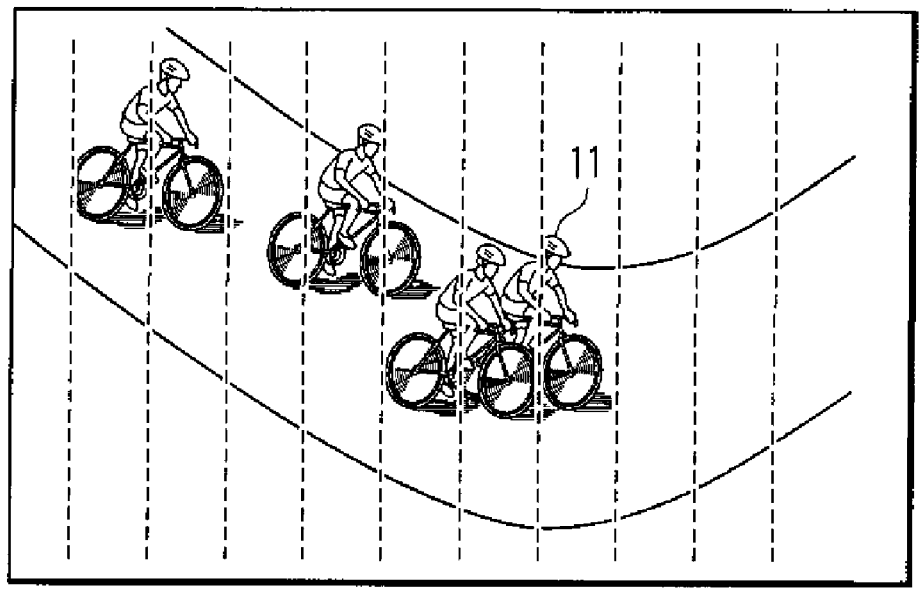
F I G. 7B

MULTI DIMENSIONAL IMAGING SYSTEM

CROSS-REFERENCE TO RELATED APPLICATIONS

This application is based upon and claims the benefit of priority from prior Japanese Patent Application No. 2006-301932, filed Nov. 7, 2006, the entire contents of which are incorporated herein by reference.

BACKGROUND OF THE INVENTION

1. Field of the Invention

The present invention relates to an image processing apparatus and, particularly, to an image processing apparatus capable of producing an image removed an obstacle positioned in front of a subject.

2. Description of the Related Art

When photography is performed of various scenes, if an obstacle is present between an imaging device and a main subject, the main subject is hidden behind the obstacle, and a desired image cannot be obtained in some cases.

Conversely, when the obstacle is a person, a vehicle or the like, a method is proposed in, for example, Jpn. Pat. Appln. KOKAI Publication No. 2001-43458, in which a background image is extracted from the motion parallax, thereby removing the obstacle. In the method disclosed in Jpn. Pat. Appln. KOKAI Publication No. 2001-43458, a plurality of images taken at different times are compared with one another for each pixel, and pixels in which no change is detected for a predetermined period of time are extracted as the background image. Such processing is performed for all the pixels in the area under surveillance, whereby an image having a mere background from which the obstacle is removed is formed.

BRIEF SUMMARY OF THE INVENTION

According to a first aspect of the present invention, there is provided an image processing apparatus comprising: a distance measurement section which measures a distance from the section to a subject for each pixel on the basis of a plurality of images photographed at different visual point positions; a setting section which sets a range of the distance in which an obstacle is present; and an image formation section which executes image processing of replacing a first image signal relating to an obstructed region included in the range of the distance with a second image signal different from the first image signal on the basis of an output from the distance measurement section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the configuration of an imaging device provided with an image processing apparatus according to a first embodiment of the present invention;

FIGS. 7A and 7B are views each showing an image separated by binary information;

DETAILED DESCRIPTION OF TEE INVENTION

Figure 2:
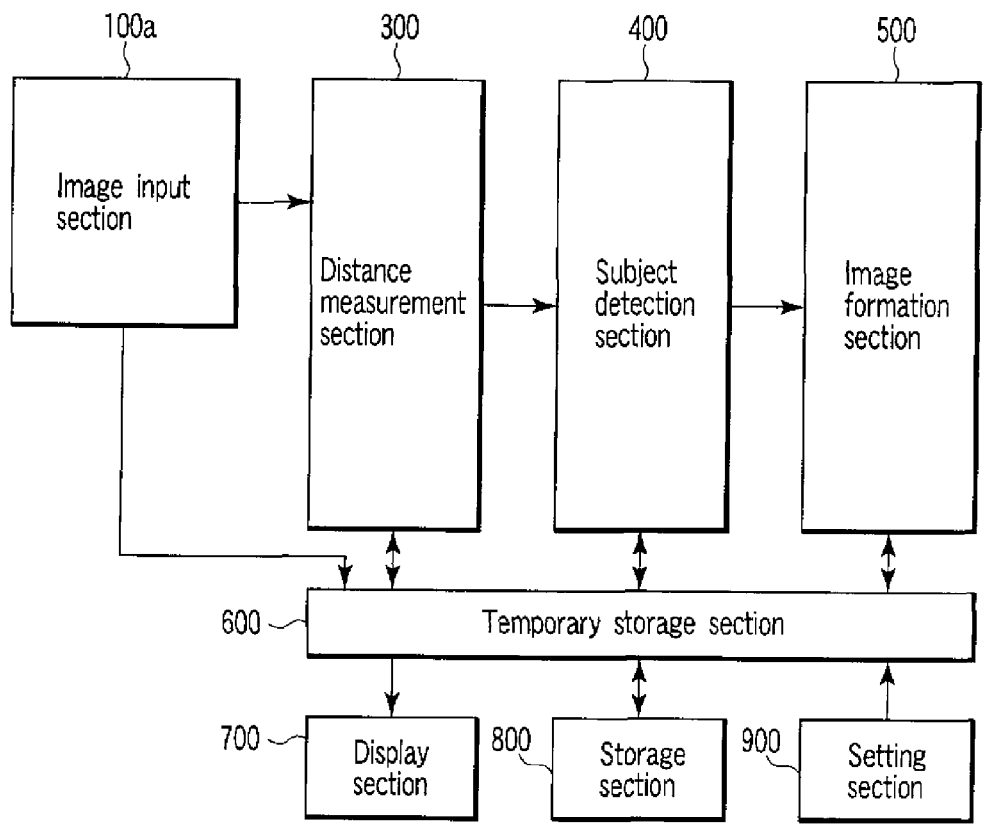
FIG. 2 is a view showing the configuration of a processing device provided with the image processing apparatus according to the first embodiment.

Embodiments of the present invention will be described below with reference to the accompanying drawings.

First Embodiment

FIG. 1 is a view showing the configuration of an imaging device provided with an image processing apparatus according to a first embodiment of the present invention. The imaging device of FIG. 1 comprises imaging sections 100 and 200 serving as an image input section, a distance measurement section 300, a subject detection section 400, an image formation section 500, a temporary storage section 600, a display section 700, a storage section 800, and a setting section 900.

The imaging sections 100 and 200 constitute an ommateal stereo camera contrived for the purpose of acquiring image signals of a plurality of frames for each visual point position by imaging a subject at different visual point positions. The imaging section 100 includes an optical system 101, an image sensor 102, and a storage section 103, and the imaging section 200 includes an optical system 201, an image sensor 202, and a storage section 203. Each of the optical systems 101 and 201 condenses light flux from the subject and forms an image on the corresponding image sensor. Each of the image sensors 102 and 202 converts the image of the subject formed and obtained by each of the optical systems 101 and 201 into an electrical signal and, after converting the analog electrical signal into a digital signal (image signal), stores the converted digital signal in the corresponding storage section. Each of the storage sections 103 and 203 temporarily stores therein the image signal obtained by each of the image sensors 102 and 202.

The distance measurement section 300 obtains distance information on a distance from itself to the subject in units of pixels by using image signals of N frames (N≧2) obtained by the imaging sections 100 and 200. The subject mentioned herein is that including both the main subject and the background subject (subject other than the main subject). Hereinafter, a set of distance information obtained by the distance measurement section 300 in units of pixels will be referred to as a range image.

The subject detection section 400 detects a region in which a subject of interest is present by using the range image obtained by the distance measurement section 300. It is assumed that the subject of interest mentioned herein is a subject upon which emphasis is laid in the removal processing of an obstacle to be described later in detail. The image formation section 500 performs predetermined image processing on the basis of the region information indicating presence/absence of the subject of interest extracted by the subject detection section 400.

Incidentally, detailed operations of the distance measurement section 300, subject detection section 400, and image formation section 500 will be described later in detail.

The temporary storage section 600 temporarily stores therein data processed by the distance measurement section 300, subject detection section 400, and image formation section 500. The display section 700 displays various images. The storage section 800 stores therein images processed by the image formation section 500. The setting section 900 is an operation section by which the user performs various items of setting.

Here, although the imaging device shown in FIG. 1 has the twin-lens stereo camera configuration provided with two imaging sections, the number of imaging sections is not limited to two. For example, a configuration provided with three or more imaging sections or a configuration in which imaging is performed a plurality of times while changing the visual point position by one or more imaging sections may be used.

Further, although FIG. 1 shows the configuration of the imaging device, this embodiment can also be applied to a processing device in which an image processing program is installed as shown in FIG. 2. In the processing device shown in FIG. 2, although the basic configuration is the same as that shown in FIG. 1, the configuration of the processing device differs from the configuration shown in FIG. 1 in having an image input section 100*a* in place of the imaging sections 100 and 200. The image input section 10*a* shown in FIG. 2 is an image input section contrived for the purpose of acquiring image signals of a plurality of frames obtained by imaging a subject at different visual point positions. The image input section 100*a* is constituted of an arbitrary storage medium in which image signals of a plurality of frames are already stored. Incidentally, a configuration in which a storage medium has also an output function may be used as the image input section 100*a* or a part of the function of the storage section 800 may include the function of the image input section 100*a*.

Subsequently, a series of operations from distance measurement to image formation in the configuration shown in FIG. 1 or 2 will be described below. In the subsequent and later descriptions, the imaging sections 100 and 200, and the image input section 100*a* are collectively called an image input section.

Figure 3:
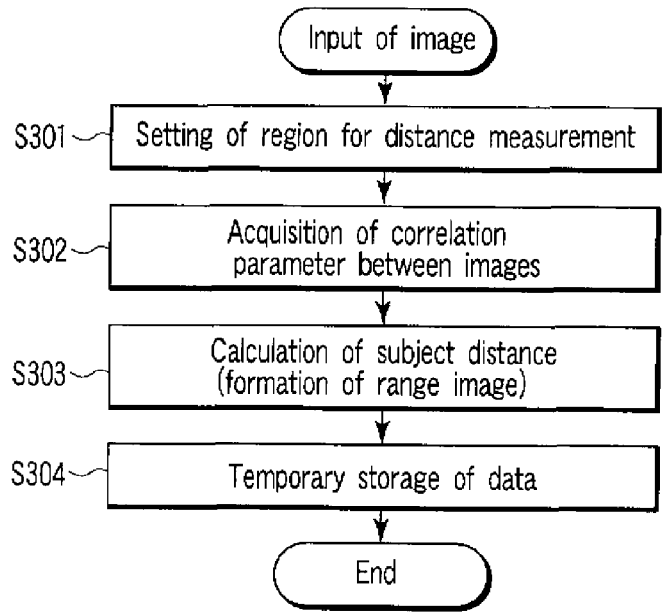
FIG. 3 is a flowchart showing processing of a distance measurement section.

FIG. 3 is a flowchart showing a flow of fundamental operations in the distance measurement section 300.

When images of N frames is input from the image input section to the distance measurement section 300, the distance measurement section 300 sets a region for acquiring distance information from the images of N frames (step S301). The distance information acquisition region may be set by, for example, a photographer by operating the setting section 900 or may be automatically set by the distance measurement section 300.

After the distance information acquisition region is set, the distance measurement section 300 calculates corresponding points between images of N frames in the distance information acquisition region by using, for example, an image correlation method for calculating correlation amount between images, and stores a correlation parameter of the corresponding point in the temporary storage section 600 (step S302). Thereafter, the distance measurement section 300 calculates information on a distance from the device to the subject for each pixel on the basis of the correlation parameter of the corresponding point (step S303). Further, the distance measurement section 300 stores the calculated range image in the temporary storage section 600 (step S304).

Figure 4:
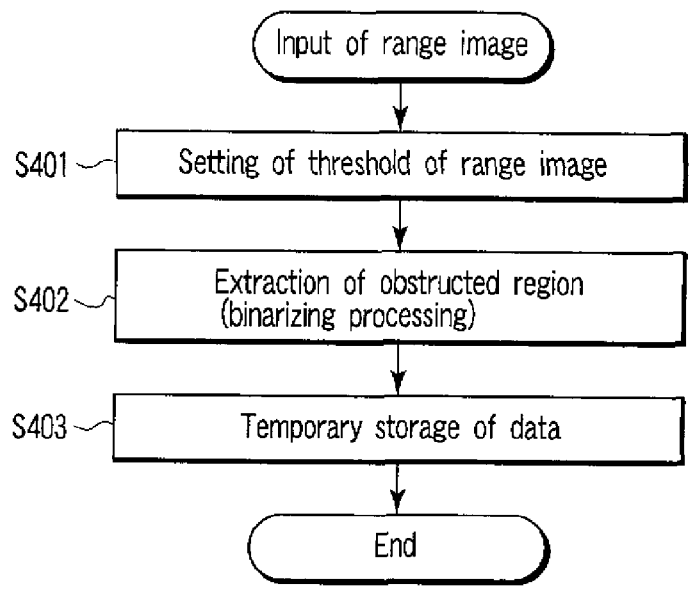
FIG. 4 is a flowchart showing processing of a subject detection section.

FIG. 4 is a flowchart showing a flow of fundamental operations in the subject detection section 400.

First, the subject detection section 400 sets threshold information of a range image set by the photographer (step S401). This threshold information is set by, for example, the photographer by operating the setting section 900.

In response to the setting of the threshold information, the subject detection section 400 reads the range image stored in the temporary storage section 600, and binarizes the distance information of each pixel of the range image in accordance with the threshold information (step S402). After binarizing the distance information of each pixel in accordance with the threshold information, the subject detection section 400 stores the binary information of each pixel in the temporary storage section 600 (step S403).

Figure 5:
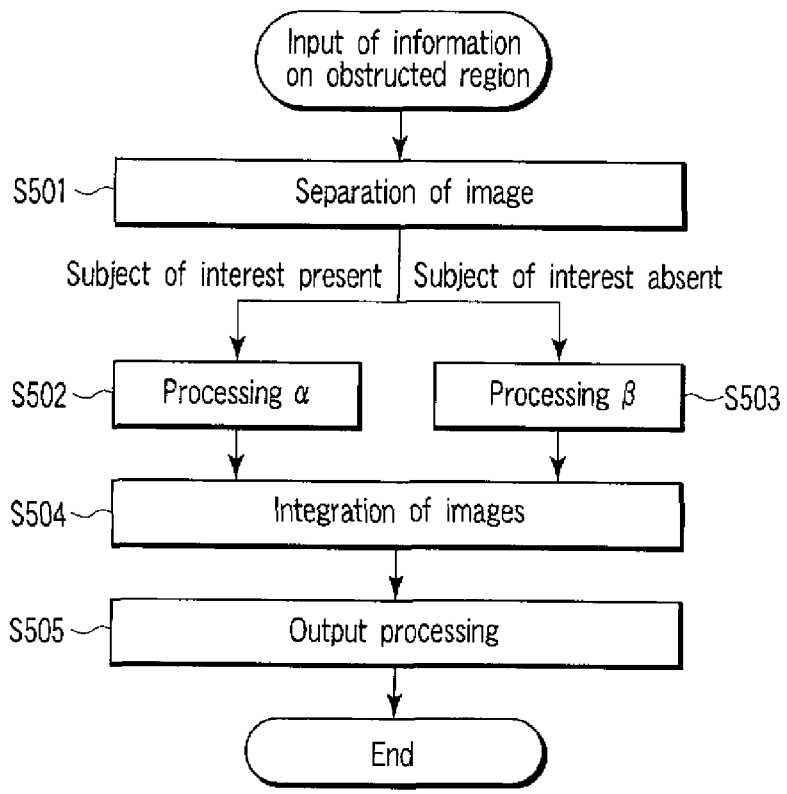
FIG. 5 is a flowchart showing processing of an image formation section.

FIG. 5 is a flowchart showing a flow of fundamental operations in the image formation section 500.

First, the image formation section 500 reads the binary information obtained by the subject detection section 400 and the image obtained by the image input section which are stored in the temporary storage section 600, and separates the read image into two regions on the basis of the binary information (step S501). Thereafter, the image formation section 500 subjects, of the two separated regions, one region in which the subject of interest is present to processing a (step S502), and subjects the other region in which the subject of interest is absent to processing β different from the processing a (step S503).

After completing image processing corresponding to each region, the image formation section 500 integrates individually processed images into one image (step S504). Further, the image formation section 500 performs output processing such as displaying the integrated image on the display section 700 and storing the image in the storage section 800 (step S505).

Subsequently, operations of the imaging device of the first embodiment will be further described below. Here, in the example to be described below, images acquired in the image input section are images of two frames shown in FIGS. 6A and 6B. Here, it is assumed that the image in FIG. 6A is an image (standard image) on the standard side used when the image correlation method is used to calculate a range image, and the image in FIG. 6B is an image (reference image) on the reference side used when the image correlation method is used.

Figure 6A:
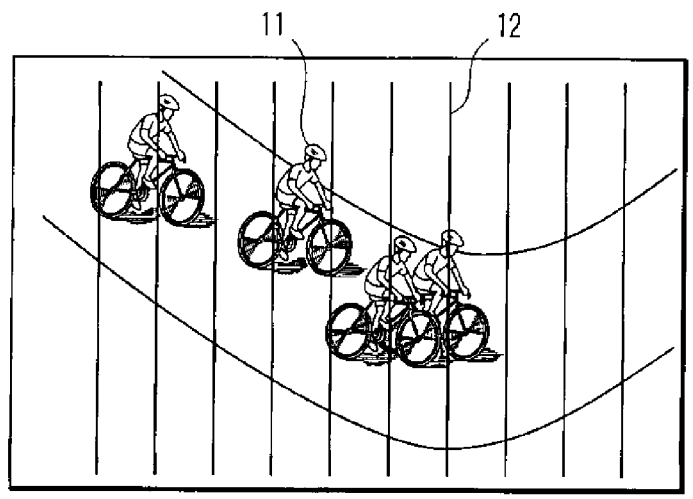
FIGS. 6A, 6B, and 6C are views each showing an example of an image photographed at different visual point positions.
Figure 6B:
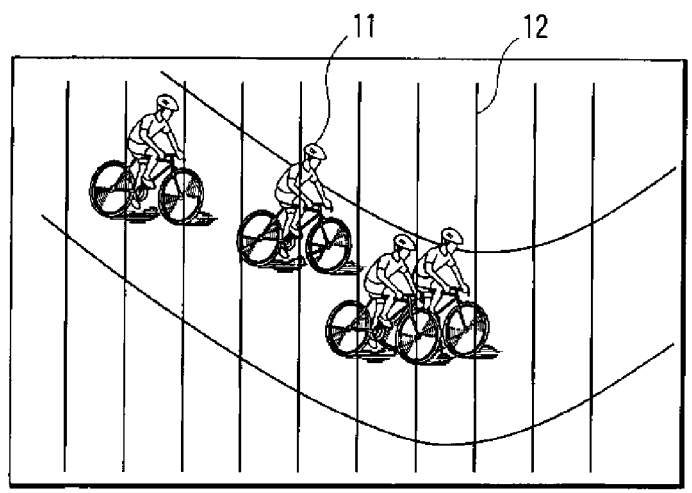

Further, in this example, both FIGS. 6A and 6B are based on the assumption that the persons 11 are the main subject, and the fence 12 present in front of the person 11 is the obstacle of the main subject. Further, the standard image (FIG. 6A) and the reference image (FIG. 6B) are used to calculate a range image, subject detection in which the obstacle is regarded as the subject of interest is performed on the basis of the calculated range image, the standard image is separated into a region in which the obstacle which is the subject of interest is present and a region in which the subject of interest is not present and, thereafter the respective regions are subjected to different types of image processing (processing α, processing β).

First, the distance measurement section 300 acquires distance information. Prior to this processing, the photographer selects the standard image and the reference image by using the setting section 900, and further sets the distance information acquisition region in the standard image. For example, the distance information acquisition region is set as the entire region of the standard image shown in FIG. 6A. In response to the setting operation, the distance measurement section 300 obtains a correlation between the standard image and the reference image in the distance information acquisition region, calculates a subject distance for each pixel in the distance information acquisition region of the standard image from the obtained correlation amount, and stores the calculated result in the temporary storage section 600 as the range image. In this manner, information on the correspondence between the pixel position (X and Y coordinates) and the subject distance in the distance information acquisition region of the standard image is stored in the temporary storage section 600.

Subsequently, the subject detection section 400 detects the subject of interest. Prior to this processing, the photographer sets a distance equal to or slightly larger than the distance from the device to the fence 12 as the threshold information by using the setting section 900. In response to this setting operation, the subject detection section 400 determines whether or not the subject distance of each pixel in the distance information acquisition region is within a predetermined distance range on the basis of the range image and the threshold information by comparing the distance information of each pixel with the threshold information. Further, the determination result is binarized, and binary information indicating presence/absence of the subject of interest (obstacle) is stored in the temporary storage section 600. Here, the threshold information is set to a distance equal to or slightly larger than the distance from the device to the fence 12, and hence when the subject distance is equal to or smaller than the threshold, the fence 12 which is the subject of interest is present in front of the persons 11 who are the main subject.

Subsequently, the image formation section 500 performs image formation processing. In this processing, the image formation section 500 first separates the standard image into two regions on the basis of the binary information obtained by the subject detection section 400. As described above, the binary information is information indicating whether or not a fence 12 which is an obstacle is present in front of the persons 11 who are the main subject. Accordingly, when the standard image is separated into two regions on the basis of this binary information, the standard image becomes, after the separation, an image in which only the fence 12 is present as shown in FIG. 7A, and an image in which the fence 12 is excluded. After separation of the standard image, the image formation section 500 subjects the obstructed region in which the subject of interest (fence 12) is present shown in FIG. 7A to the processing α. In this example, processing of replacing the image signal (first image signal) of the fence 12 in the obstructed region with an image signal (second image signal) of a specific color is performed as the processing α. On the other hand, the region in which the subject of interest is not present shown in FIG. 7B is subjected to no processing related to obstacle removal as the processing β. After the image processing is completed, the image formation section 500 integrates the image of FIG. 7A and the image of FIG. 7B into one image on the basis of the binary information and, the image obtained after the integration in the manner as shown in FIG. 8A is output to the outside by, for example, displaying the resultant image on the display section 700 and storing the image data in the storage section 800.

Figure 8A:
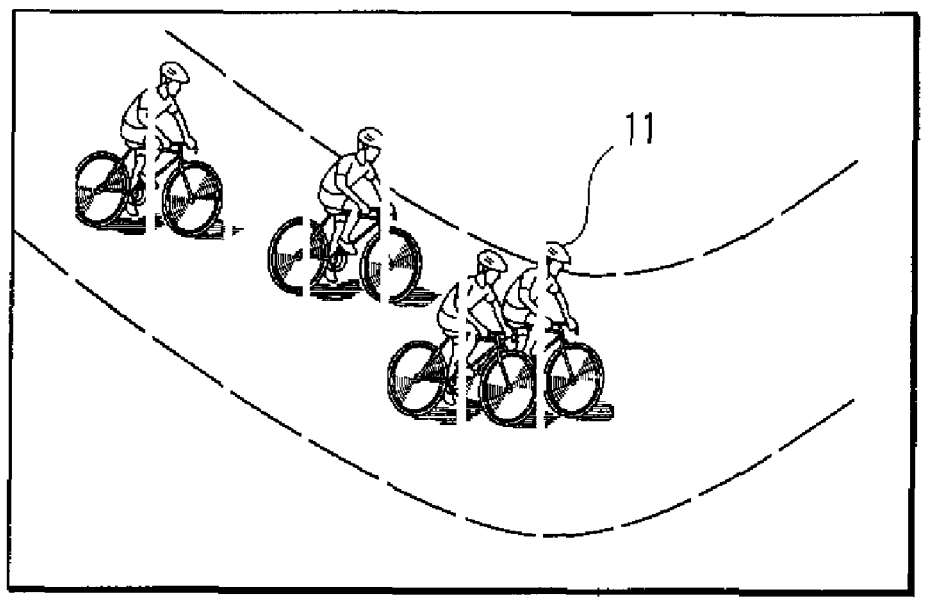
FIGS. 8A and 8B are views each showing an example of an image obtained in the image formation section.

As described above, according to the first embodiment, by a series of operations from the distance measurement in the distance measurement section 300 to the image formation in the image formation section 500, it is possible to edit the image such that the obstacle (fence 12) which obstructs the photography becomes inconspicuous, and form an image as shown in FIG. 8A. At this time, the threshold information is set and a subject present closer to the device than the main subject is recognized as an obstacle, and hence even when motion parallax is not obtained, it is possible to recognize the obstacle. It is further possible to form a desired image by separating an image including the obstacle which is the subject of interest and an image including no obstacle from each other, and subjecting each of the images to separate processing.

Second Embodiment

Next, a second embodiment of the present invention will be described below. In the second embodiment, although a configuration identical with the configuration of the first embodiment can be used as the configuration of the device, processing in an image formation section 500 is different from that in the first embodiment. Further, in the second embodiment, images acquired in an image input section are images of three frames shown in FIGS. 6A to 6C. These images are images acquired at three different visual point positions.

Figure 6C:
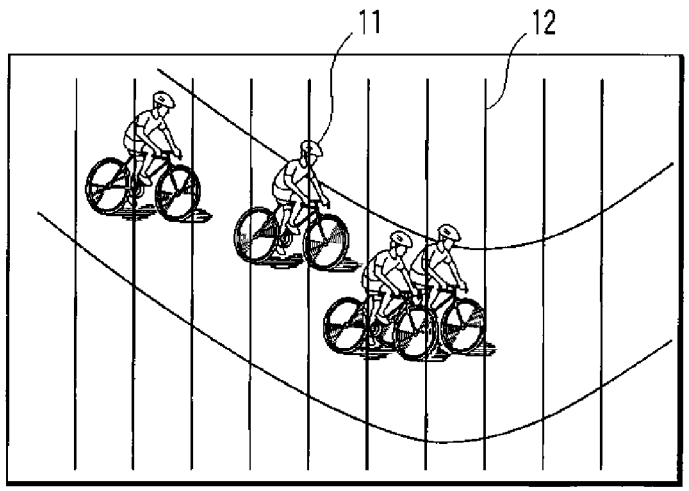

Further, in the second embodiment too, FIGS. 6A to 6C are based on the assumption that the persons 11 are the main subject, and the fence 12 present in front of the person 11 is the obstacle of the main subject. Further, the standard image (FIG. 6A) and the reference image (FIG. 6B) are used to calculate a range image, subject detection in which the obstacle is regarded as the subject of interest is performed on the basis of the calculated range image, the standard image is separated into a region in which the obstacle is present and a region in which the obstacle is not present and, thereafter the respective regions are subjected to different types of image processing (processing α, processing β) by using the reference images (FIGS. 6B and 6C) excluding the standard image.

Operations of the second embodiment will be described below. First, a distance measurement section 300 acquires distance information. Prior to this processing, the photographer selects the standard image and the reference images by using a setting section 900, and further sets the distance information acquisition region in the standard image. For example, the distance information acquisition region is set as the entire region of the standard image shown in FIG. 6A as in the first embodiment. In response to the setting operation, a distance measurement section 300 calculates a subject distance for each pixel in the distance information acquisition region of the standard image, and stores it in a temporary storage section 600 as the range image. In this manner, information on the correspondence between the pixel position (X and Y coordinates) and the subject distance in the distance information acquisition region of the standard image is stored in the temporary storage section 600.

Subsequently, a subject detection section 400 performs subject detection in which the obstacle (fence 12) is set as the subject of interest. In this processing, the same processing as the first embodiment is performed, and the subject detection section 400 stores binary information indicating presence/absence of the subject of interest for each pixel in the temporary storage section 600.

Figure 9:
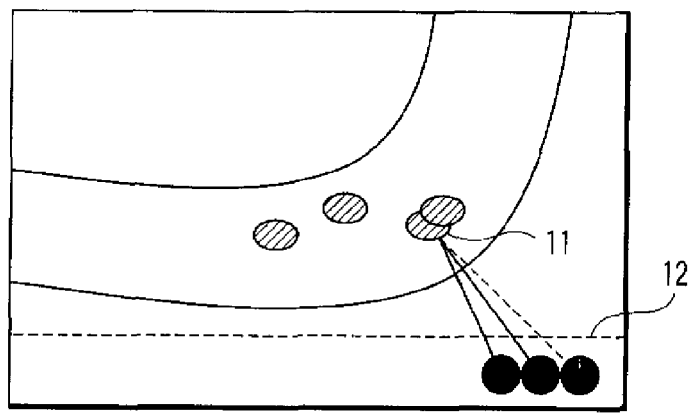
FIG. 9 is an overhead image of a visual point position.

Subsequently, an image formation section 500 performs image formation processing. In this processing, the image formation section 500 first separates the standard image into two regions on the basis of the binary information obtained by the subject detection section 400. The images obtained after the separation are the image shown in FIG. 7A and the image shown in FIG. 7B. Here, when photography is performed from the visual point positions shown in FIG. 9, even when the fence 12 can be removed, the part which is present ahead of the fence 12 is in a blind spot, and hence it is very difficult to obtain information on the subject the rear of the fence 12 by only the standard image. Hence, in the first embodiment, the part corresponding to the fence 12 is replaced with a part having a specific color.

On the contrary, in the second embodiment, a correlation parameter of a point which is in the blind spot caused by the fence 12 in the standard image of FIG. 6A is calculated from an image correlation between the image of FIG. 6B and the image of FIG. 6C. Subsequently, the image formation section 500 replaces an image signal of the fence 12 in the obstacle region with an image signal of the rear of the fence 12 obtained from FIG. 6B or 6C on the basis of the correlation parameter calculated in the distance measurement section 300 as the processing α. On the other hand, as the processing β, no processing is performed as in the first embodiment. After the image processing is completed, the image formation section 500 integrates the image of FIG. 7B which has been subjected to the replacement processing and the image of FIG. 7A into one image, and outputs the thus obtained image shown in FIG. 8B to the outside by, for example, displaying it on a display section 700 and storing it in a storage section 800. If the image information on the obstacle region is insufficient and the image of the fence 12 cannot be removed at a time, it is enough just to remove the image signals of the fence 12 in a stepwise manner by further adding a reference image and repeating the above processing.

Figure 8B:
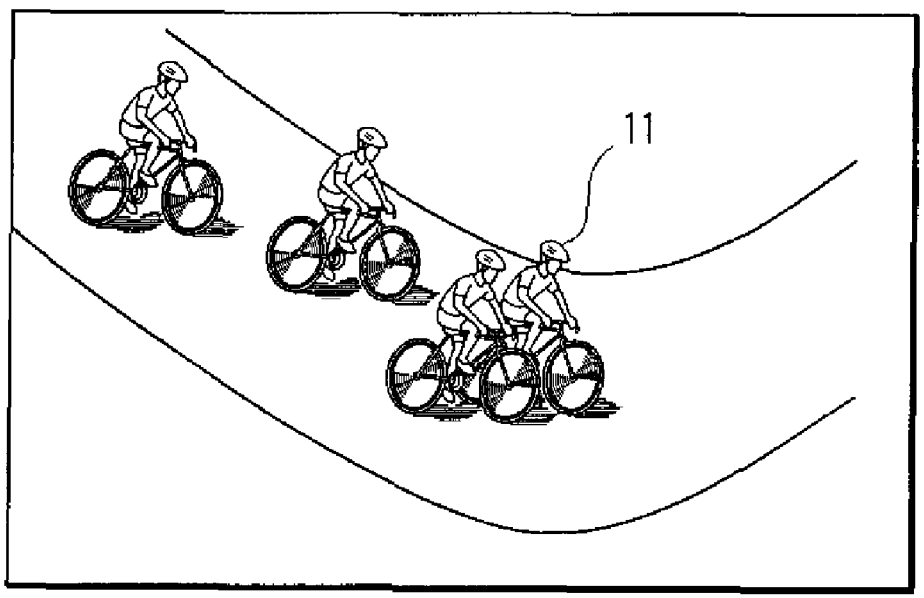

As described above, according to the second embodiment, by a series of operations from the distance measurement in the distance measurement section 300 to the image formation in the image formation section 500, it is possible to remove the fence 12 which obstructs the photography of the persons 11, replace the image signal corresponding to the rear position of the removed part with the image signal obtained from the other visual point position, and form an image shown in FIG. 8B more natural than the image shown in FIG. 8A. As described above, in the second embodiment, the image signals of pixels of a part in which the fence 12 that is the subject of interest is present are removed, the void is supplemented by image signals of the other image frame, and thus the desired image can be formed.

Third Embodiment

Next, a third embodiment of the present invention will be described below. In the third embodiment, a configuration identical with the configuration of the first embodiment can be used as the configuration of the device. Incidentally, in the third embodiment, acquisition of the image and distance information is the same as the first embodiment, and hence a description thereof is omitted.

Operations of the third embodiment will be described below. First, a subject detection section 400 performs subject detection in which an obstacle is set as the subject of interest. Prior to this processing, the photographer sets a distance equal to or slightly larger than the distance from the device to the fence 12 as the threshold information by using a setting section 900. In response to this setting operation, the subject detection section 400 determines whether or not each pixel in the distance information acquisition region (entire pixels) is within a predetermined distance range by distance comparison on the basis of the range image and the threshold information. Further, the determination result is binarized in units of pixels, and binary information indicative of presence/absence of the subject of interest is stored in a temporary storage section 600.

Subsequently, an image formation section 500 performs image formation processing. First, the image formation section 500 separates the standard image into two regions on the basis of the binary information obtained by the subject detection section 400. The images obtained in this case after the separation are as shown in FIGS. 7A and 7B. Here, as described in the second embodiment, when photography is performed from the visual point positions shown in FIG. 9, even when the image signals of the fence 12 can be removed, the part which is present ahead of the fence 12 is in a blind spot, and hence it is very difficult to obtain information on the subject the rear of the fence 12 by only the standard image. Further, a case can be considered where sufficient information cannot be obtained from image signals of the other frame unlike in the second embodiment. Thus, in the third embodiment, the image formation section 500 regards the region in which the obstacle (fence 12) is present as defective pixels, and obtains image signals of the defective pixels by interpolation of peripheral image signals of the defective pixels in the same frame as the processing α. On the contrary, as the processing β, no processing is performed as in the first embodiment. After the image processing is completed, the image formation section 500 outputs the image as shown in FIG. 8B obtained by performing the interpolation processing to the outside by, for example, displaying it on a display section 700 and storing it in a storage section 800.

As described above, by a series of operations from the distance measurement in the distance measurement section 300 to the image formation in the image formation section 500, it is possible to remove the fence 12 which obstructs the photography of the persons 11, and supplement the removed part by interpolation of the peripheral image signals of the removed part, and form an image as shown in FIG. 8B. As described above, the image signals of pixels of a part in which the fence 12 that is the subject of interest is present are removed, the void is supplemented by image signals of the same frame, and thus the desired image can be formed under conditions of a small number of times of photography.

Fourth Embodiment

Next, a fourth embodiment of the present invention will be described below. In the fourth embodiment, a configuration identical with the configuration of the first embodiment can be used as the configuration of the device. Further, in the fourth embodiment, acquisition of the image and distance information in the preceding stage of the subject detection is the same as the embodiments described above, and hence a description thereof is omitted.

Operations of the third embodiment will be described below. Prior to the detection of the subject of interest in a subject detection section 400, the photographer sets a distance equal to or slightly larger than the distance from the device to the fence 12 as the threshold information by using a setting section 900. In response to this setting operation, the subject detection section 400 determines whether or not an image signal of each pixel in the distance information acquisition region is within a predetermined distance range by distance comparison on the basis of the range image and the threshold information. Further, the determination result is binarized in units of pixels, and binary information indicative of presence/absence of the subject of interest is stored in a temporary storage section 600.

Subsequently, an image formation section 500 performs image formation processing. First, the image formation section 500 separates the standard image into two regions on the basis of the binary information obtained by the subject detection section 400. The images obtained in this case after the separation are as shown in FIGS. 7A and 7B. Further, the image formation section 500 subjects the image of only the fence 12 which is the subject of interest shown in FIG. 7A to flattening processing as the processing α, and subjects the image of the part other than the subject of interest shown in FIG. 7B to sharpening processing as the processing β. After the image processing is completed, the image formation section 500 integrates the image subjected to the flattening processing on the basis of the binary information shown in FIG. 7A and the image subjected to the sharpening processing shown in FIG. 7B into one image, and outputs the image obtained after the integration to the outside by, for example, displaying it on a display section 700, and storing it in a storage section 800.

As described above, it is possible to perform particular filtering processing which makes the persons more conspicuous by blurring the image of the fence 12 which is the obstacle, and sharpening the image of the person 11 who are the main subject. Further, it is possible to perform adaptive two-dimensional filtering processing for varying the block size in accordance with distance information in such a manner that a subject at a short distance is made a large block and a subject at a long distance is made a small block in consideration of the characteristic in which as the subject distance becomes larger, the size of the image becomes smaller. If the image information on the obstacle region is insufficient and the image of the fence 12 cannot be removed at a time, it is enough just to remove the image signals of the fence 12 in a stepwise manner by further adding a reference image and repeating the above processing.

As described above, according to the fourth embodiment, through a series of operations from the distance measurement in the distance measurement section 300 to the image formation in the image formation section 500, by separating the image into two images on the basis of the binary information, and integrating the two images into one image after subjecting the separated images to different image processing, it is possible to independently subject the separated images to image processing. Further, at this time, different subjects are not affected by their different processing operations.

Fifth Embodiment

Next, a fifth embodiment of the present invention will be described below. In the fifth embodiment, an image input section is an ommateal stereo camera for acquiring image signals of a plurality of frames photographed at different visual point positions. Further, images of a subject formed on image sensors 102 and 202 by optical systems 101 and 201 are converted into digital image signals and, are thereafter stored in storages sections 103 and 203, respectively. Here, in the fifth embodiment, imaging sections 100 and 200 are each provided with a function capable of contracting a digital image signal and thereafter outputting the contracted image signal. This contraction may be performed by, for example, pixel thinning or by pixel mixing. Further, forming sections for forming a contracted image may be provided outside the imaging sections 100 and 200.

Here, as in the first embodiment, the number of imaging sections is not limited to two. For example, a configuration in which three or more imaging sections are provided or a configuration in which photography is performed a plurality of times while changing the visual point position by one or more imaging sections may be used.

Operations of the fifth embodiment will be described below. First, two images (FIGS. 6A and 6B) photographed by the imaging sections 100 and 200 at different visual point positions are acquired. At this time, when a contraction image mode is set by the photographer by an operation of a setting section 900, the imaging sections 100 and 200 store the obtained images in a temporary storing section 600 after contracting them.

Thereafter, distance measurement, subject detection, and image formation which are described in the first to fourth embodiments are performed by using the contracted images. Further, after integration of the images, an image formation section 500 displays an estimation image which will be obtained after the integration of the images and which is formed from the contracted images on a display section 700 in a simplified manner.

As described above, according to the fifth embodiment, an image is formed by integrating contracted images into one image, whereby it is possible to enhance the speed of processing by reducing a data amount and a calculation load. Furthermore, when image signals subjected to thinning processing or image mixing processing in the image sensor and successively output are used, an image can be displayed in real time. As a result of this, it becomes possible to confirm the state before photography, and thereafter perform actual photography.

Incidentally, as for information to be displayed on the display section 700, an input image and distance information (range image) which are formed in a series of processing operations, and a detection state or the like of a subject of interest may be displayed in addition to the estimation image formed from the contracted images. By displaying these images, the photographer can perform optimization of setting while confirming the intermediate state.

Sixth Embodiment

Next, a sixth embodiment of the present invention will be described below. The sixth embodiment relates to processing to be performed after image formation in an image formation section 500 is performed.

First, a series of processing operations from image acquisition to image formation is performed in the same manner as that in the first embodiment. Then, before storing an image obtained by image formation in a storage section 800, a contracted image of this image is formed in, for example, the image formation section 500, and the formed image is displayed on a display section 700 in a simplified manner.

As described above, according to the sixth embodiment, by displaying the image obtained after the image formation in a simplified manner, it is possible to confirm the image to be obtained after the image formation before the image data is actually stored. As a result of this, the photographer can repeat photography over and over again until a satisfactory result is obtained without paying regard to the capacity of the storage region of the storage section 800. Furthermore, in the sixth embodiment, unlike in the fifth embodiment, the processing up to immediately before display is performed with respect to the image of the normal size, and hence it is possible to suppress deterioration in resolution to be caused after image formation, and confirm the formation result in detail.

Seventh Embodiment

Next, a seventh embodiment of the present invention will be described below. The seventh embodiment relates to a modification example of the subject detection method. Incidentally, in the seventh embodiment, acquisition of an image is identical with that of the first embodiment, and hence a description thereof is omitted.

Operations of the seventh embodiment will be described below. First, distance information is acquired. Prior to this processing, the photographer first selects a standard image and a reference image by using a setting section 900, and further sets a distance information acquisition region in the standard image. For example, the entire region of the standard image shown in FIG. 6A is set as the distance information acquisition region. In response to this setting operation, a distance measurement section 300 obtains a correlation between the standard image and the reference image in the distance information acquisition region, calculates a subject distance for each pixel in the distance information acquisition region of the standard image from the obtained correlation amount, and stores the calculated result in a temporary storage section 600 as the range image. In this manner, information on the correspondence between the pixel position (X and Y coordinates) and the subject distance in the distance information acquisition region of the standard image is stored in the temporary storage section 600.

Figure 10:
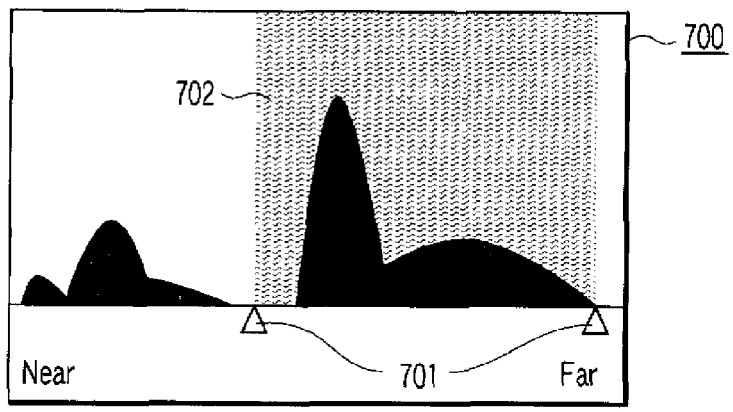
FIG. 10 is a view for explaining setting of threshold information by using a distance histogram.

Then, a distance measurement section 300 displays a distance histogram indicating appearance frequency distribution of distances on a display section 700. That is the distance measurement section 300 first acquires the range image stored in the temporary storage section 600, accumulates distance information of each pixel in the range image for each distance, and calculates frequency distribution of the subject distances. Further, the distance measurement section 300 forms a histogram from the frequency distribution, and displays the histogram on the display section 700. FIG. 10 shows a distance histogram to be displayed on the display section 700.

Next, the photographer performs setting of threshold information by using the setting section 900. In the setting of the threshold information, in a distance histogram displayed as shown in, for example, FIG. 10, the photographer moves pointers 701 by operating the setting section 900, and sets a predetermined distance range 702 in which the subject of interest is included. Here, in the example shown in FIG. 10, unlike in the embodiments described above, by designating the persons 11 as the main subject, a subject present closer to the device than the persons 11 is regarded as an obstacle, and an image formation section 500 removes image signals of the position of the obstacle or replaces the image signals with image signals of the other image. Needless to say, the fence 12 which is the obstacle may be directly designated as an obstacle. Further in the example shown in FIG. 10, although an example in which only one distance range can be set is shown, it is possible to designate a plurality of distance ranges at a time.

Although it is normally difficult to estimate threshold information of a subject distance from visual information, in the seventh embodiment, by displaying the distance histogram in a visible manner, the photographer can confirm the position at which the subject is present, optimize the threshold information on the basis of the confirmation result, and make the subject detection condition highly accurate. Furthermore, by using an interface for designating a range by designating pointers 701 shown in FIG. 10, threshold information can be set by a simple operation.

Eighth Embodiment

Next, an eighth embodiment of the present invention will be described below. The eighth embodiment relates to another modification example of the subject detection method. Incidentally, in the eighth embodiment, acquisition of an image and distance information is identical with that of the first embodiment, and hence a description thereof is omitted.

Figure 11:
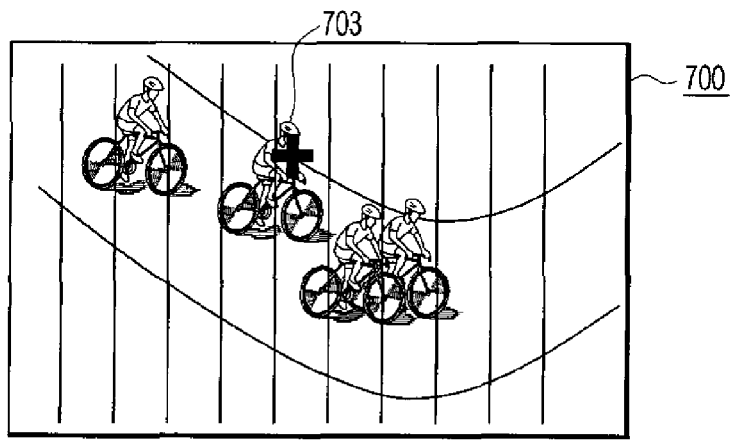
FIG. 11 is a view for explaining setting of threshold information by using coordinate information.

Operations of the eighth embodiment will be described below. First, after an image and distance information are acquired, an image obtained by imaging sections 100 and 200 is displayed on a display section 700 as shown in FIG. 11. Then, the photographer performs setting of position coordinates of a subject of interest (herein, as in the seventh embodiment, persons 11 are the subject of interest) by using a pointer 703 while confirming the subject of interest on the display section 700. In response to this operation, a distance measurement section 300 acquires a subject distance in the position coordinates of the pointer 703. Further, this subject distance is set as threshold information.

Although it is normally difficult to estimate threshold information of a subject distance from visual information, in the eighth embodiment, it is possible to set the subject detection condition with high accuracy by confirming a position at which the subject of interest is present on the basis of an actually photographed image and by setting a threshold of the distance information on the basis of the information. Furthermore, by using an interface for designating a subject of interest by using the pointer shown in FIG. 11, it is possible to designate the subject of interest by a simple operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a distance measurement section which measures a distance from the section to a subject for each pixel on the basis of a plurality of images photographed at different visual point positions;
a display section which displays appearance frequency distribution of distances measured by the distance measurement section;
a setting section which sets a range of the distance in which an obstacle is present on the basis of the appearance frequency distribution displayed on the display section, wherein the obstacle appears as an obstructed region in an image; and
an image formation section which executes image processing of removing the obstructed region and replacing the obstructed region with an image signal different from the obstructed image on the basis of an output from the distance measurement section,
wherein the image formation section includes:
a first image processing section which executes image processing relating to the obstructed region;
a second image processing section which subjects a region different from the obstructed region to image processing different from the image processing relating to the obstructed region; and
an image integration section which integrates an output from the first image processing section and an output from the second image processing section into one result.

2. The image processing apparatus according to claim 1, wherein the image formation section uses an image signal relating to a background region of an image having a background region corresponding to the obstructed region as the second image signal.

3. The image processing apparatus according to claim 1, wherein the image formation section uses an image signal obtained by being interpolated by peripheral image signals of the obstructed region as the second image signal.

4. The image processing apparatus according to claim 1, further comprising an image contraction section which contracts the image prior to image processing in the image formation section.

5. The image processing apparatus according to claim 1, further comprising an image contraction section which contracts an image output from the image formation section.

6. The image processing apparatus according to claim 1, further comprising a display section which displays the image, wherein the setting section includes:

an input section which inputs a position for setting the range of the distance on the basis of the image displayed on the display section; and a distance range setting section which sets a range of a distance corresponding to the input position on the basis of an output from the distance measurement section.

* * * * *